Jan. 11, 1949.							R. HAPPE						2,458,904
				DYNAMOELECTRIC MACHINE WITH
				INTEGRAL CONNECTOR BOXES
Filed April 23, 1945							2 Sheets-Sheet 1

Inventor
Reynold Happe

Jan. 11, 1949.　　　　　R. HAPPE　　　　　2,458,904
DYNAMOELECTRIC MACHINE WITH
INTEGRAL CONNECTOR BOXES

Filed April 23, 1945　　　　　　　　　　　2 Sheets-Sheet 2

Inventor
Reynold Happe
By Joel G. Stanford
Attorney

Witness:
Godfrey Pecina

Patented Jan. 11, 1949

2,458,904

UNITED STATES PATENT OFFICE 2,458,904

DYNAMOELECTRIC MACHINE WITH INTEGRAL CONNECTOR BOXES

Reynold Happe, Pittstown, N. J., assignor to The Singer Manufacturing Company, Elizabeth, N. J., a corporation of New Jersey Application April 23, 1945, Serial No. 589,847

6 Claims. (Cl. 171—252)

This invention relates to dynamoelectric machines and more particularly to electrical connector structure for small electric motors adapted to furnish the driving power for sewing machines, typewriters, fans and similar apparatus.

It has already been proposed to incorporate in a single unitary casing both an electric motor and plug-socket for making electrical connections thereto.

Heretofore, in making connections between the motor windings and the supply socket terminals, it has been customary to first mechanically secure the elements in their normal position and then electrically connect them, by means of conductors, requiring joining, by soldering or similar means at least at one end of each conductor. This requires not only some means of access to the part to be soldered but also some closure means for preventing accidental contact with the "live" electrical part after it has been soldered or joined. These requirements are undesirable and at best result in cramped assembly and unnecessary and complicated compartments and covers therefor.

It is an object of the invention, therefore, to provide electric motor structure in which all the soldering necessary to join the parts electrically may be completed before the parts are assembled mechanically.

This has been obtained by providing a motor assembly in which the act of mechanically assembling the end-covers provides means for making both an electrical connection and a closed compartment within which it is made.

With the above and other objects in view, as will hereinafter appear, the invention comprises the devices, combinations, and arrangements of parts hereinafter set forth and illustrated in the accompanying drawings of a preferred embodiment of the invention from which the several features thereof and the advantages attained thereby will be readily understood by those skilled in the art.

Figure 1:
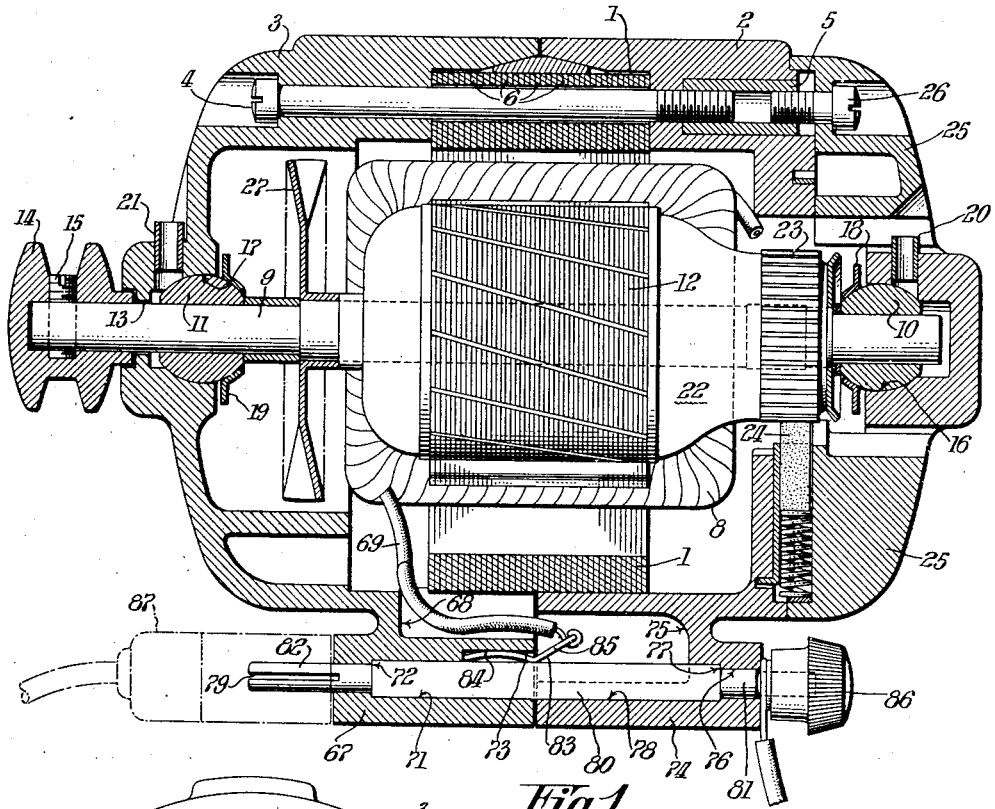
Figure 2:
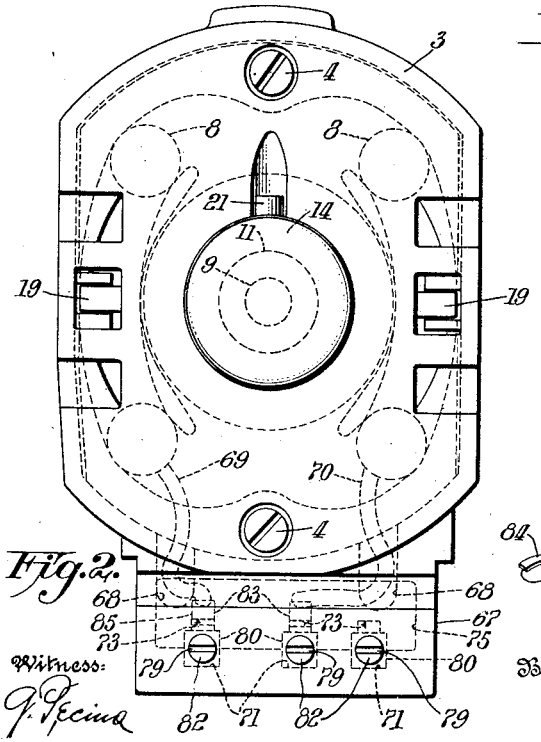
Figure 4:
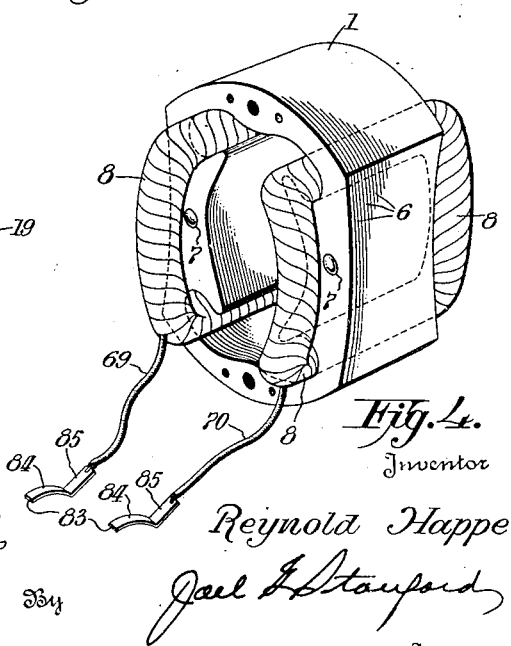
Figure 3:
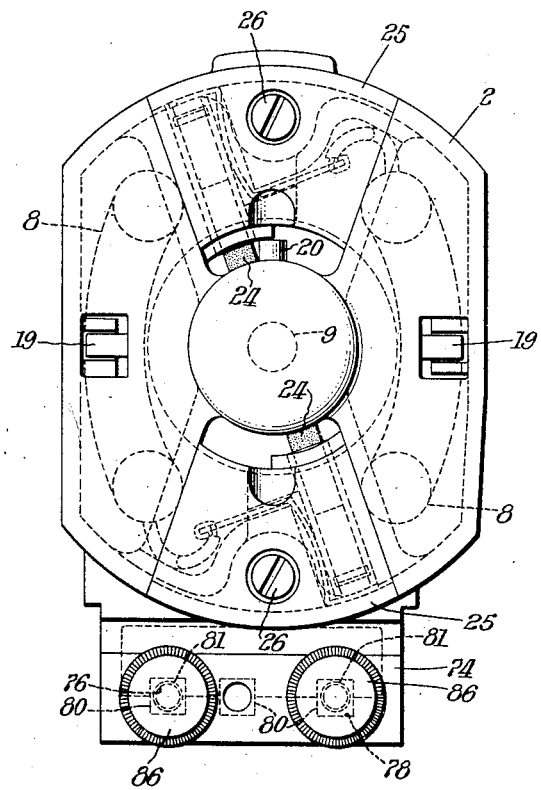
Figure 5:
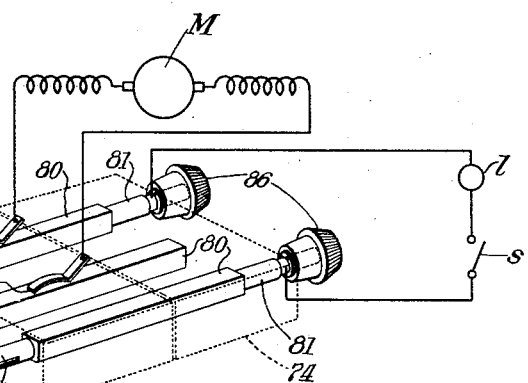

In the accompanying drawings, Fig. 1 is a longitudinal sectional view taken through an electric motor embodying the invention. Fig. 2 is a front-end elevational view, partly in section, of the motor of Fig. 1. Fig. 3 is a rear-end elevational view, partly in section, of the motor of Fig. 1. Fig. 4 is a detail perspective view of a stator core assembly for the motor of Fig. 1. Fig. 5 is a diagrammatic view of the electrical circuits employed for the motor of Fig. 1.

The motor is constructed with a stator core 1, held in clamped relation between the commutator end-cover 2, and the pulley end-cover 3, by means of screws 4 which extend longitudinally through the parts and are threaded into bushings 5—5, preferably of metal and removably carried in recesses in the end-cover 2. The stator core 1 is made up of thin stacked magnetic laminations 6 held together by rivets 7 and carries current-conducting windings 8 thereon as is well known in the art. The end-covers, 2 and 3, are preferably made of molded insulation material. A shaft 9 journaled in self-aligning bearings 10 and 11 carries a rotor core which is mounted for rotation in the usual manner within the stator core 1. The shaft 9 extends through an aperture 13 in the end-cover 3 and has a power take-off pulley 14 secured to its outer end by means of screw 15.

For a more complete description of this motor construction, particularly of the relation of case to core, reference may be had to the copending application Serial No. 589,778 of Edgar P. Turner, filed April 23, 1945.

The bearings 10 and 11 are held within spherical seats 16 and 17 respectively in end-covers 2 and 3 by spring retainers 18 and 19. This bearing construction forms the subject matter of the copending application Serial No. 589,779 to Edgar P. Turner, filed April 23, 1945, now Patent No. 2,448,500, issued August 31, 1948 to which reference may be had for a more complete description thereof.

Small nipples 20 and 21, pressed into suitable ducts within the respective end-covers, give access from without to the bearings 10 and 11 within for applying lubricating oil thereto.

The rotor core 12 carries the usual current-conducting winding 22 connected to commutator 23 in the usual manner.

Brushes 24—24 bear against diametrically opposite portions of the commutator 23 to permit transfer thereto of current from an external supply circuit as is well known in the art. Removable brush covers 25—25, held in place by screws 26—26 threaded into the bushings 5—5, give access to the brushes for examination and for replacement thereof. For a more complete description of this brush structure, reference may be had to my copending application Serial No. 589,846 filed April 23, 1945, now Patent No. 2,444,826, issued July 6, 1948.

A fan 27, pressed onto a portion of the shaft 9, rotates therewith to cause ventilating air to be circulated longitudinally through the motor, as is customary with motors of this type.

According to the present invention, the end-covers 2 and 3 are each formed with a depending terminal-holding portion molded integrally therewith. The depending portion 67 on the pulley end-cover 3 is a block-like structure formed with two symmetrical recessed portions 68—68 cut into the wall and of sufficient longitudinal extent to permit conducting leads 69 and 70 from the field coils to be led therethrough beneath the stator core as shown in Fig. 1. Three longitudinal, spaced-apart ducts 71 are provided in the block-like depending portion and extend completely through it from inside face to outside face. Each duct presents a circular cross-section at the outside face which section, in traversing the duct, becomes square and provides a shoulder at point 72.

This square section then continues until the point is reached where the section is further modified by the addition thereto of a small clearance slot opening 73 into the top side of said square section. This modified square section persists throughout the remainder of the slot traversal to the inside face of the block-like portion.

On the commutator end-cover 2 and formed integrally therewith is a hollow depending portion 74 having a substantial recess 75 let into the inner face thereof. The outer wall portion is pierced longitudinally by three ducts 76 spaced apart so as to align themselves with the respective ducts 67 in the pulley end-cover (and described hereinbefore), when the end-covers are assembled to form the motor case. Each of the ducts 76 is formed with a circular section at the outside face, which section becomes square at shoulder 77 and continues thus as the duct is traversed, until it pierces the rear wall of the recess. Part of the duct, when extended beyond this wall, lies below the surface of the bottom wall of the recess and thus provides therein a longitudinal slot 78 of rectangular cross-section.

Into each of said ducts is placed a conducting terminal stud having a body portion 80 of square section, one end portion 81 of round section terminating in a threaded portion, and the other end portion 82 also of round section but terminating in a portion formed with a longitudinal slot 79 providing two laterally resilient prongs. The stud in the center duct does not have the terminal portion 81 like the others. It will be observed that the junctures of the square and round sections both in the ducts and on the terminal studs provide shoulders which cooperate to provide positioning stops for locating the studs when the two end-covers are in assembled condition.

Before final assembly, the stator-core assembly will be provided, as shown in Fig. 4, with spring terminals 83 soldered to the ends of leads 69 and 70 from the field coils 8. During final assembly, these leads are placed in the recessed portions 68 beneath the stator core and then the free ends thereof are reversed and the spring terminals 83 connected thereto are forced within the clearance slots 73. These spring terminals 83, made of Phosphor bronze or beryllium copper, are formed with a bowed portion 84 and a lug portion 85. The bowed portion, in its unsprung condition and seated within one of the clearance slots, extends partially into the duct 71 below it; so that, when a terminal stud is pushed within this duct, the bowed portion is compressed within the slot and the increased lateral thrust thus produced secures the spring terminal in good mechanical and electrical contact with the terminal stud. When the commutator end-cover 2 is assembled with the terminal studs engaging the respective ducts, the threaded portions 81 thereof project beyond the outer face where they are capped with insulated screws 86 to form binding posts for convenience in connecting a lamp or other device thereto, as desired.

The other ends 82 of the terminal studs project through the outer face of portion 67 to provide the male portion of a plug and socket arrangement for supplying electric power to the motor. A three-conductor female socket 87 for cooperating with said male plug, is shown in Fig. 1 in engaged position therewith.

It will be seen that, in assembled condition, the recess 75 provides an adequate confined compartment for housing the end-turns of the leads from the field coils, as shown clearly in Fig. 1. This construction thus insures against the exposure of any dangerous "live" electrical parts and makes unnecessary the tedious soldering of parts within confined spaces.

Reference to Fig. 5, which is self-explanatory, shows the complete electrical circuit in diagram form, including the motor M, a lamp l, a lamp-switch s, a motor controller c, a supply line P and their connections.

From the foregoing description considered in connection with the accompanying drawings, the construction, manner of operation and several advantages of my improved integral connector box for dynamoelectric machines will be clearly and fully understood. It is apparent that such a construction has a wide variety of uses and it will be understood that the form and arrangement of the elements employed are susceptible of material variation. Therefore, the privilege is reserved of resorting to all such legitimate changes therein as may be fairly embodied within the spirit of the accompanying claims.

Having thus set forth the nature of the invention, what I claim herein is:

1. In a dynamoelectric machine, a stator core, a split casing providing two opposed end-covers for said core and formed with apertures having internal shoulders, a current-conducting winding carried by said core, conducting leads connected to said winding, spring lugs connected to said leads, and terminal studs received in said apertures and secured therein in contact with said spring lugs by means of said shoulders when said end-covers are assembled to form said casing.

2. In a dynamoelectric machine, a stator core, a current-conducting winding on said core, leads connected to said winding and terminated in spring terminals, a split case providing two end-covers formed with depending portions containing apertures provided with internal shoulders, said apertures being in register to form a plurality of ducts when the end-covers are in assembled position, and conducting studs formed with an intermediate body portion and with portions of reduced diameter at the opposite ends providing external shoulders, said studs being positioned in said ducts so that said spring terminals are in contact with said intermediate body portions and so that the external shoulders of said studs are in engagement with the internal shoulders of said apertures to prevent endwise displacement of said studs, the reduced diameter portions thereof protruding beyond the exterior of said depending portions at the opposite ends of said case.

3. In a dynamoelectric machine, a stator core, a winding carried by said core, molded end-covers containing recesses and apertures provided with internal shoulders, said apertures being in register to form a plurality of ducts when the end-covers are in assembled position, conducting studs formed with an intermediate body portion and with portions of reduced diameter at the opposite ends thereof providing external shoulders, and connector means disposed within said recesses and connecting said studs to said stator core winding, said studs being positioned in said ducts so that the external shoulders of said studs are in engagement with the internal shoulders of said apertures to prevent relative endwise displacement thereof, the reduced diameter portions thereof extending beyond the exterior of said end-covers at the opposite ends of said machine.

4. In a dynamoelectric machine, a split case providing end-covers, each having a core-holding and a terminal-holding portion, apertures disposed in said terminal-holding portion and provided with internal shoulders, said apertures being in register to form a plurality of ducts when the end-covers are in assembled position, a stator core with windings thereon disposed in said core-holding portion, recess means for communicating between said core-holding and terminal-holding portions, connector means located in said recess means and connected to said windings, and conducting studs connected to said connector means and formed with an intermediate body portion and with portions of reduced diameter at the opposite ends thereof providing external shoulders, said studs being positioned in said ducts so that the external shoulders of said studs are in engagement with the internal shoulders of said apertures to prevent endwise displacement of said studs, the reduced diameter portions thereof extending beyond the exterior of said end-covers at the opposite ends of said case to afford means for electrically connecting said machine to external circuits.

5. In a dynamoelectric machine having a stator core with windings thereon, a split case providing end-covers containing apertures provided with internal shoulders, said apertures being in register to form a plurality of ducts when the end-covers are in assembled position, connecting means recessed in said end-covers and connected to said stator windings, and conducting studs connected to said connecting means and formed with an intermediate body portion and with portions of reduced diameter at the opposite ends thereof providing external shoulders, said studs being positioned in said ducts so that, when assembled, the external shoulders of said studs are in engagement with the internal shoulders of said apertures to prevent endwise displacement of said studs within said ducts, the reduced diameter portions thereof extending beyond the exterior of said end-covers at the opposite ends of said case to enable external circuits to be electrically connected to said stator windings.

6. In a dynamoelectric machine having a stator core, a split casing providing two opposed end-covers for said stator core and formed with depending terminal-holding portions, a current-conducting winding carried by said core, conducting leads connected to said winding, spring lugs connected to said leads, and terminal studs in contact with said spring lugs and formed with end portions of reduced diameter received in said terminal-holding portions, said end portions protruding from said terminal-holding portions at least at one end of said casing.

REYNOLD HAPPE.

REFERENCES CITED

The following references are of record in the file of this patent:

UNITED STATES PATENTS

| Number | Name | Date |
| --- | --- | --- |
| 738,782 | Edwards | Sept. 15, 1903 |
| 751,191 | Maxim | Feb. 2, 1904 |
| 1,262,198 | Jacobson | Apr. 9, 1918 |
| 1,926,228 | Clark | Sept. 12, 1933 |
| 1,926,441 | Gilbert | Sept. 12, 1933 |
| 1,959,895 | Bayliss | May 22, 1934 |
| 2,158,145 | Oster | May 16, 1939 |
| 2,396,007 | Happe | Mar. 5, 1946 |